United States Patent [19]
Gates

[11] Patent Number: 5,326,504
[45] Date of Patent: Jul. 5, 1994

[54] ORDERED PACKING

[75] Inventor: Robert G. Gates, Mendham, N.J.

[73] Assignee: The BOC Group, Inc., New Providence, N.J.

[21] Appl. No.: 106,738

[22] Filed: Aug. 16, 1993

[51] Int. Cl.⁵ ............................................. B01F 3/04
[52] U.S. Cl. ............................................... 261/112.1
[58] Field of Search ............................ 261/112.1, 111

[56] References Cited

U.S. PATENT DOCUMENTS

| | | | |
|---|---|---|---|
| 3,343,821 | 9/1967 | Winn et al. | 261/112.1 |
| 3,969,447 | 7/1976 | Glitsch et al. | 261/111 |
| 4,171,334 | 10/1979 | Reiter | 261/112.1 |
| 4,497,752 | 2/1985 | Huber | 261/112.1 |
| 4,532,086 | 7/1985 | Pluss | 261/112.1 |
| 4,744,928 | 5/1988 | Meier | 261/112.1 |

Primary Examiner—Tim Miles
Attorney, Agent, or Firm—David M Rosenblum; Larry R. Cassett

[57] ABSTRACT

An ordered packing comprising elongated elements having lengthwise extending surfaces configured to be wet by a liquid phase to thereby form a film thereon. The elongated elements are packed together into a structure such that in each of a plurality of parallel planes, extending in two orthogonal directions, the elongated elements cross one another to form lattices having openings defined between the crossings of the elements. The elongated elements are interleaved within the structure such that elongated elements pass through the openings in the lattices and form repeating clusters of four of the elongated elements in a pyramid-like arrangement. Each of the clusters of the elongated elements and their lengthwise extending surfaces provide pathways for the film to descend through the structure. The structure has an open area for a vapor phase to ascend through the structure and contact the liquid phase.

6 Claims, 4 Drawing Sheets

ORDERED PACKING

BACKGROUND OF THE INVENTION

The present invention relates to an ordered packing to intimately contact vapor and liquid phases ascending and descending within a column.

The prior art has provided liquid-gas mass transfer elements within columns or towers to bring ascending and descending vapor and liquid phases into intimate contact in distillation and absorption processes. Common liquid-gas mass transfer elements are sieve trays, plates and packing elements. Packing elements can be random or dumped such as the well known Rachid rings or can have a fixed or ordered structure relative to the column axes. The latter packings include structured packings, which consist of parallel metal or woven gauze sheets that can be crimped in a herringbone or sinusoidal pattern. Each of the sheets can also have an embossment. The sheets are assembled face to face so that the directions of the crimpings cross one another to provide alternate pathways for the vapor to ascend and the liquid to descend through the packing in a counter-current direction to one another. Perforations can be provided within the sheets to permit mass transfer in a direction normal to the sheets.

In structured packings formed by vertically arranged sheets, as the liquid descends through the packing, it will, by and large, spread out along two opposite directions parallel to the sheets. Therefore, liquid flow in a direction normal to the sheets will be inhibited. The perforations provided in the sheets permit some liquid migration in a direction normal to the sheets, however, such perforations only make up less than 10% of the area provided by the sheets and hence, such migration is limited.

A further problem related to the use of any structured packing concerns the possibility of deformation of the packing due to shocks and vibrations attendant upon the transportation of a column containing structured packing to an erection site. It is this possibility of packing deformation which can limit the size of factory built packings.

The packing is normally installed in a column or tower in segments, each segment filling the diameter of the column or tower and consisting of packing material of identical orientation bounded by horizontal planes spaced apart by six or more inches. In the usual arrangement, each segment is rotated 90° about its vertical axis in relation to the segments above and below, placing the vertical planes of the sheets in the adjacent segments.

As will be discussed, the present invention provides an ordered packing that inherently provides a more uniform distribution of descending liquid through the packing. Additionally, the ordered packing of the present invention is stronger than the crimped, sheet-type structured packing of the prior art to permit larger factory packed columns to be produced.

SUMMARY OF THE INVENTION

The present invention provides an ordered packing for intimately contacting a vapor phase with a liquid phase. The ordered packing comprises a plurality of elongated elements. Each of the elongated elements has at least one elongated surface configured to be wet by the liquid phase and thereby form a film of the liquid phase on the at least one elongated surface. The plurality of elongated elements is packed to form a structure such that in each of a plurality of parallel planes, extending in two orthogonal directions, the elongated elements cross one another to form lattices having openings defined between the crossings of the elements. The plurality of elongated elements is interleaved within the structure such that the elongated elements pass through the openings of the lattices and form repeating clusters of four of the elongated elements in a pyramid-like arrangement. The pyramid-like arrangement of elements formed in each of the clusters and the at least one elongated surface of each of the elongated elements thereof provide at least four pathways for the liquid to descend through the structure. The structure has an open area for the vapor phase to ascend through the structure and contact the descending liquid phase.

Instead of having the preferential bi-directional distribution path of prior art structured packing, the packing of the present invention has four different pathways for the liquid phase to descend anywhere in a packing in accordance with the present invention. Moreover, the structure formed by the elongated elements is strong enough to permit large masses of packings to be assembled within a column in a factory installation and to allow the finished column to be transported to a site of intended use.

BRIEF DESCRIPTION OF THE DRAWINGS

While the specification concludes with claims distinctly pointing out the subject matter that applicant regards as his invention, it is believed that the invention will be better understood when taken in connection with the accompanying drawings in which:

DETAILED DESCRIPTION

Figure 1:
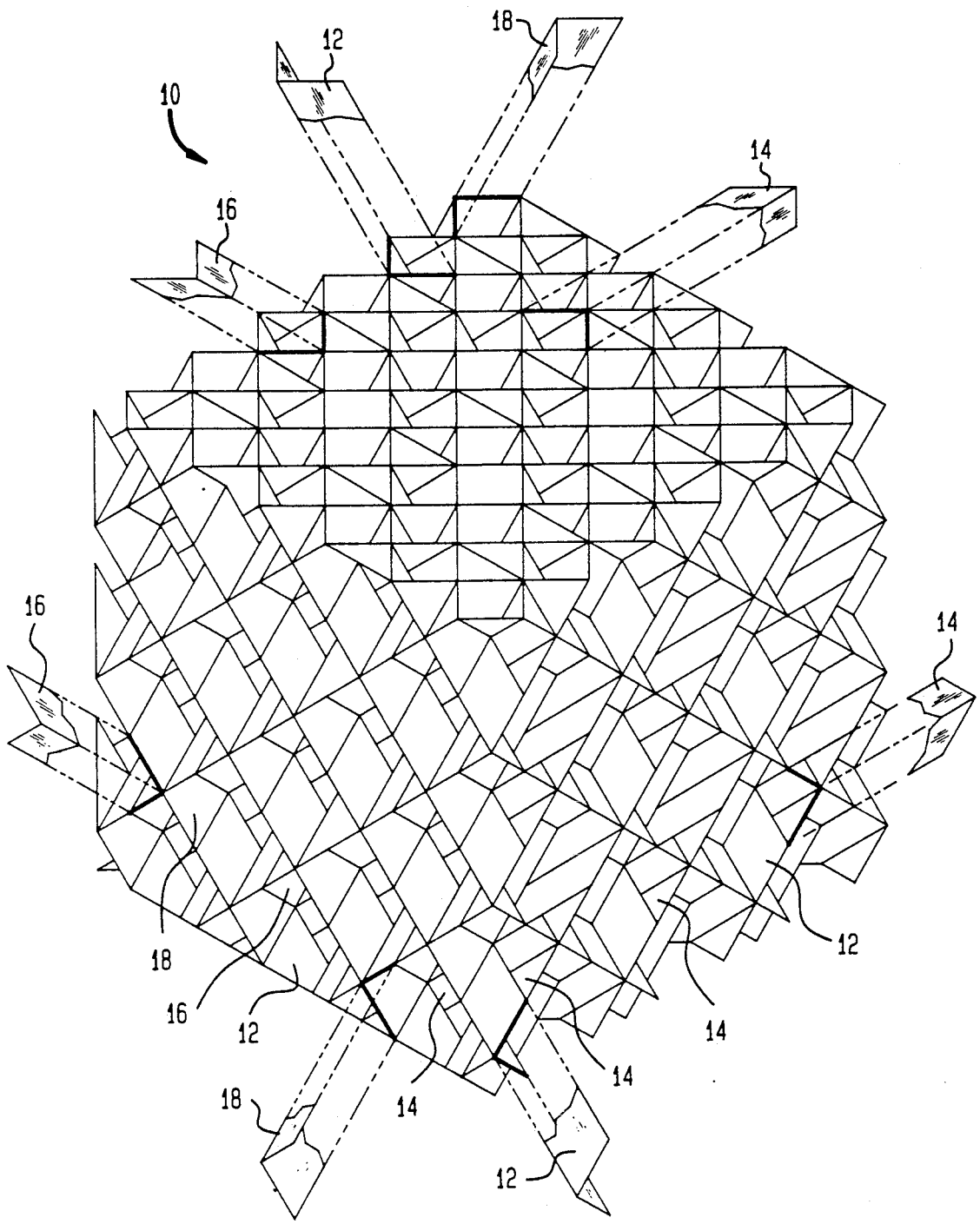
FIG. 1 is a perspective view of an ordered packing formulated in accordance with the present invention. Elongated elements have been extended by phantom lines to help one follow the various elongated elements of the packing.

With reference to FIG. 1, a section of an ordered packing 10 in accordance with the present invention is illustrated. The section of ordered packing 10 could be a portion of a cylindrical mass of packing used in forming a packing bed within a distillation or absorption column. However, it is understood, that the packing could be formed in any shape and for any purpose or use involving contacting a liquid phase and a vapor phase.

Figure 2A:
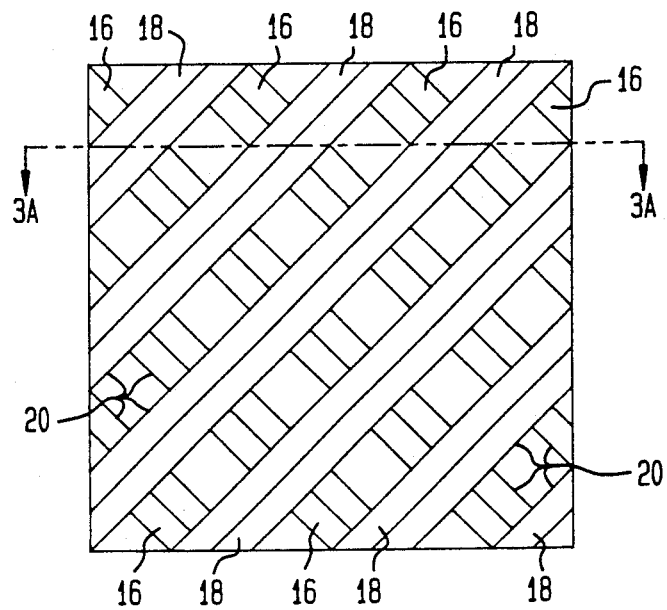
FIG. 2A is a side elevational view of FIG. 1 with elongated elements extending parallel to a plane having a normal orientation to this figure removed to illustrate a lattice of the elongated elements.
Figure 2B:
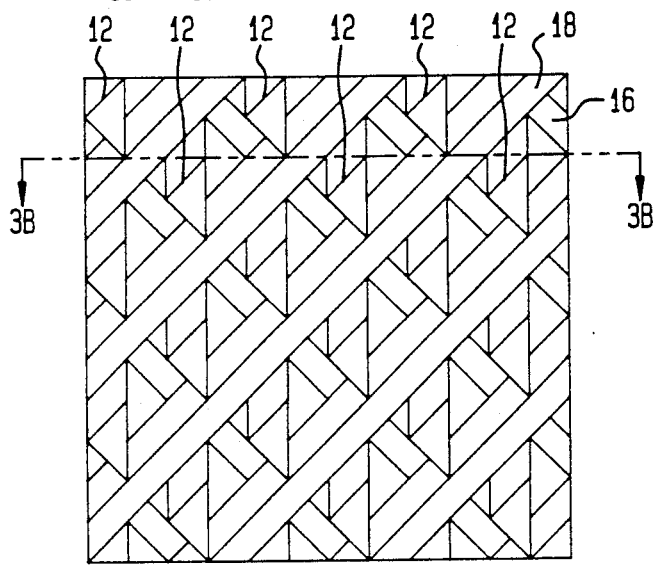
FIG. 2B is a fragmentary, side elevational view of FIG. 1 with elongated elements oriented in a plane normal and extending inwardly from the illustration removed.

With additional reference to FIGS. 2A, 2B, 3A and 3B, ordered packing 10 of the present invention is formed from a plurality of elongated elements 12 through 18. Elongated elements 12 through 18 are assembled to form a structure such that in a plurality of parallel planes extending in two orthogonal directions, the elongated elements cross one another to form lattices. One of the lattices can be seen in FIG. 2A for elements 16 and 18. In FIG. 2A, elements 12 and 14 have been removed to show the form of such a lattice. Similarly, in FIG. 2B, elements 14 have been removed to show an elevation view of the lattices formed by elements 16 and 18. In each of these lattices, the elements cross one another to define openings, for instance openings 20 defined between the crossings of the elements 16 and 18. Similar openings would be formed between the crossings of elements 12 and 14. Preferably, the angle of crossing of elongated elements 12 and 14; and elements 16 and 18 is about 90°. It is to be noted that not all elements 12 through 18 have the same length to form the cube of ordered packing shown in FIG. 1. In order to construct the cubic section of ordered packing 10, the lengths of diagonal elements decrease towards the corner of the cube.

Figure 2C:
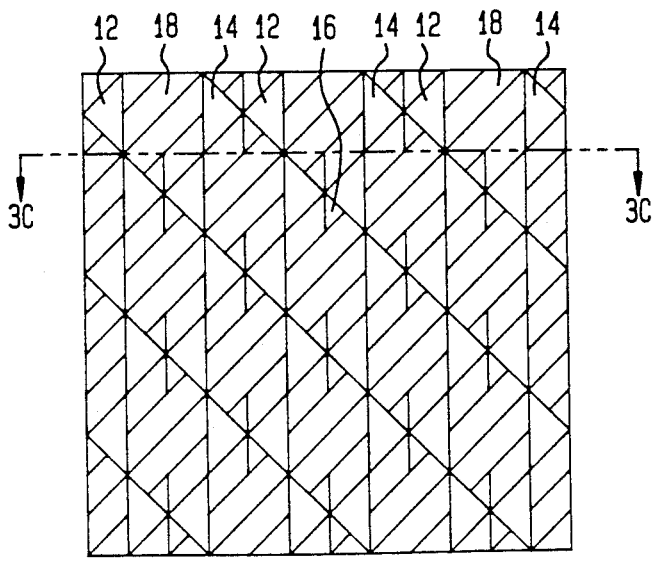
FIG. 2C is a side elevational view of FIG. 1 as seen from the same vantage as FIG. 2B, with the elongated elements oriented in a plane normal and extending inwardly from the illustration added.
Figure 3A:
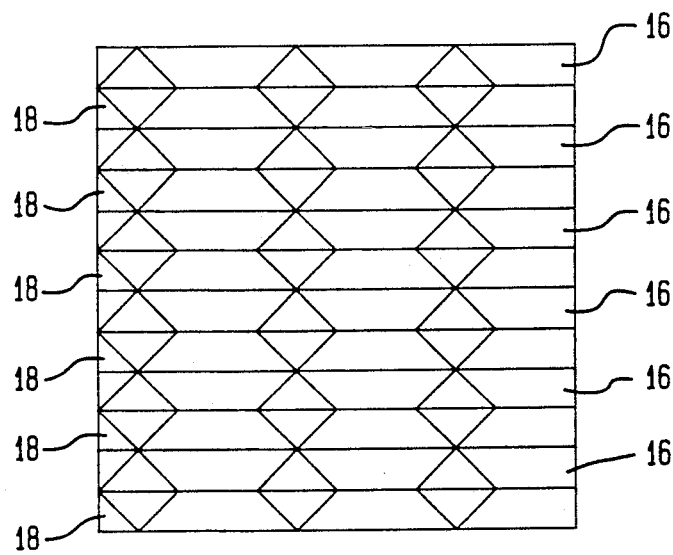
FIG. 3A is a cross-sectional view of FIG. 2A taken along line 3A—3A of FIG. 2A.
Figure 3B:
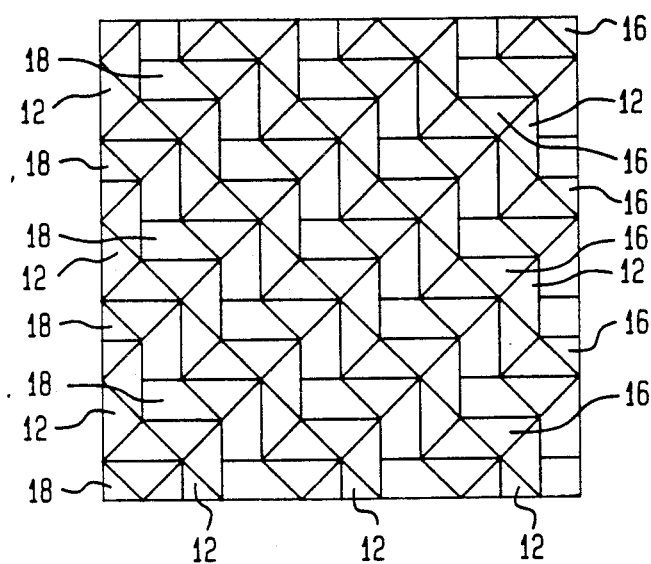
FIG. 3B is a cross-sectional view of FIG. 2B taken along line 3B—3B of FIG. 2B.
Figure 3C:
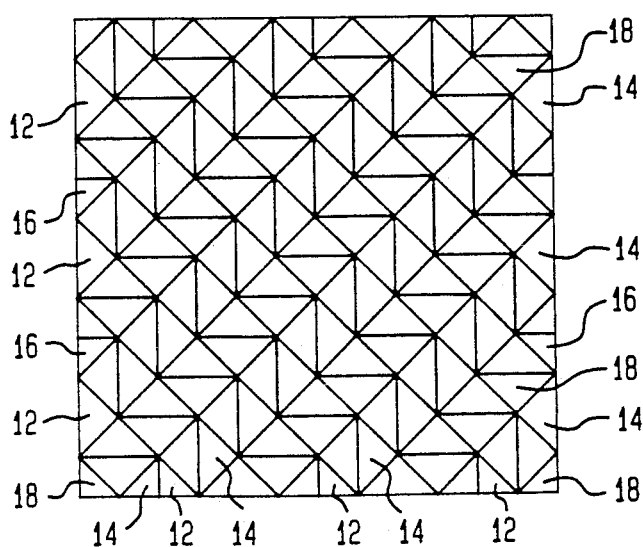
FIG. 3C is a cross-sectional view of FIG. 1 derived by the combination of FIGS. 3A and 3B.

With reference to FIG. 2C and 3C, elongated elements 12 through 18 are interleaved. In the interleaving, elements 12 and 14 pass through openings 20 of the lattices formed by elongated elements 16 and 18; and elongated elements 16 and 18 pass through similar openings defined between elements 12 and 14. FIGS. 3A and 3B are another illustration of the lattices extending along a plurality of parallel planes oriented in two orthogonal directions.

Figure 4:
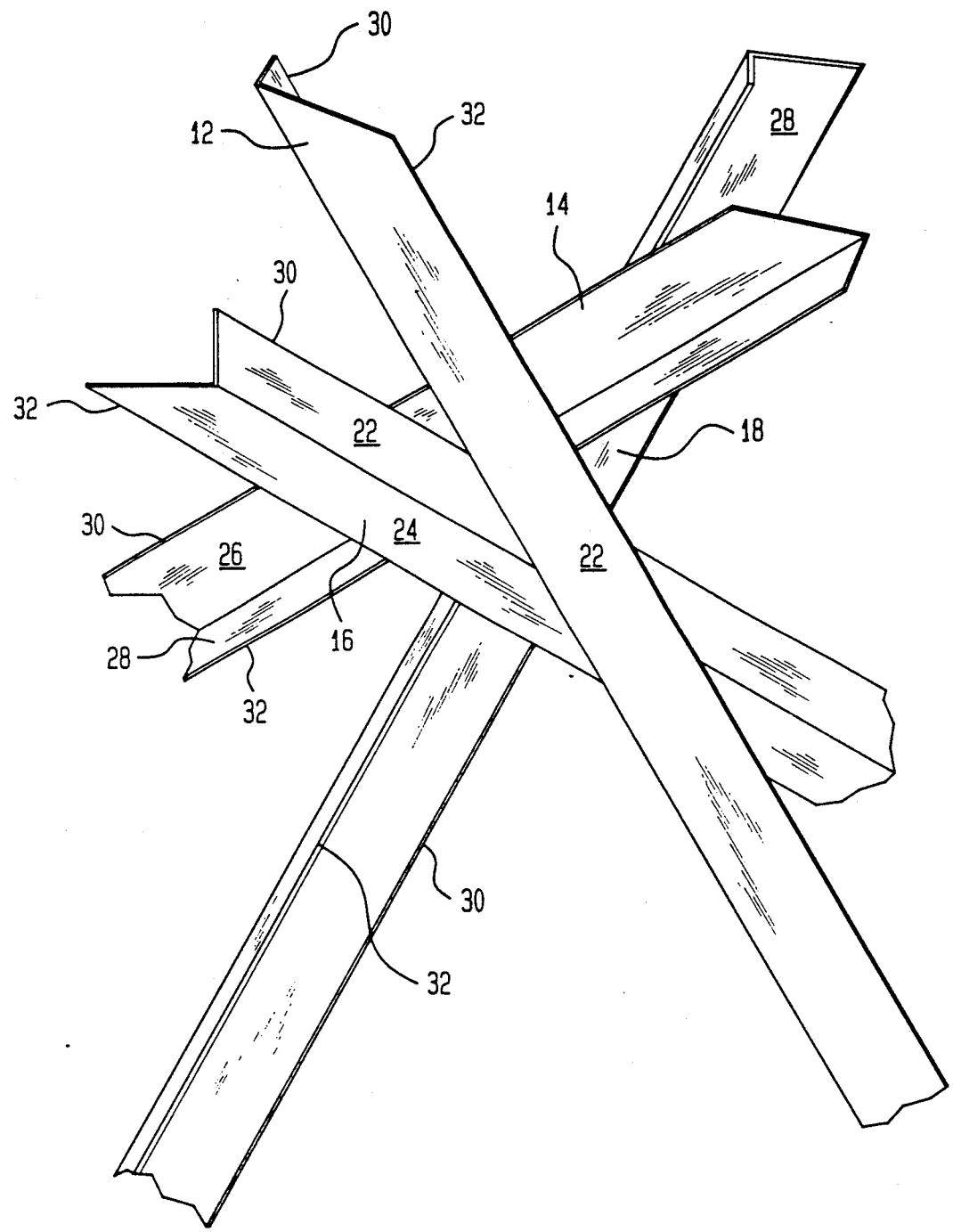
FIG. 4 is an enlarged perspective view of a cluster of four elongated elements arranged in a pyramid-like arrangement of the ordered packing of FIG. 1 illustrated in isolation from the other elongated elements making up the ordered packing of FIG. 1.

With further reference to FIG. 4, the interleaving of the elements produces repeating clusters of elongated elements 12 through 18 in a pyramid-like arrangement. By "pyramid-like" it is understood that this term does not mean that elongated elements 12 through 18 intersect one another in an apex, but rather, that elongated elements 12 through 18 cross one another to extend out in four directions and that surfaces of the elements therefore extending in the four directions form pathways for the film of liquid phase to descend within the structure. In ordered packing 10, the pathways are formed by elongated surfaces of each of the elongated elements 12 through 18 denoted by reference numerals 22 through 28. As such, each element contributes four pathways for the film to descend through the structure of elongated elements 12 through 18.

Elongated elements 12 through 18 are formed by L-shaped channels and as such, each have lengthwise extending edges, 30 and 32. Elongated elements 12 through 18 are oriented so that elongated edges 30 and 32 of elements 12 and 14 contact one another at their crossings and elongated edges 30 and 32 of elements 16 and 18 contact one another at their crossings.

Ordered packing 10 has an open area. Generally speaking, the assemblage of elongated elements 12 through 18 fits within a bounded volume, for instance a distillation column. The actual volume taken up by the elongated elements 12 through 18 alone is much less than the bounded volume and this difference provides the "open area." In the illustrated embodiment, the open area is formed by the space between the L-shaped channels. Vapor can ascend through the ordered packing through such open area to contact the descending liquid phase.

Although not illustrated, elongated elements 12 through 18 could be embossed, and/or further could have perforations as in prior art, vertically arranged sheet-like structured packing. It is also possible to have elongated elements 12 through 18 intersect at an angle different from 90° to change the performance of the packing. For instance if a 60° angle were used, there would be more open space between elongated elements to increase the open area of the packing while providing steeper surfaces for the falling film to decrease residence time of the liquid phase within the packing. It is also possible to form an ordered packing in accordance with the present invention out of elongated elements other than L-shaped channels, for instance rods. In such case, each element would contribute a single surface to be wet by the falling film.

Ordered packing 10 is assembled from sheet-like material which is first crimped in an accordion-like manner and at an angle of, for instance 45° to form a 90° crossing angle. The sheet-like material is then cut to form two spined combs of elongated elements which are used to form two sets of the elongated elements. The combs are then criss-crossed and attached together with, for instance, two spot welds to form lattices in one orthogonal direction. After removal of the spines of the combs, a series of the formed lattices can be held in a conventionally formed jig. Spined combs of elongated elements are then oriented in the other of the two orthogonal directions and are interleaved with the formed lattices. The spines of such combs are then removed and the elongated elements, for instance, 16 and 18 are appropriately attached to elongated elements 12 and 14.

While the invention has been described in reference to preferred embodiment, it will be understood by those skilled in the art that numerous additions, omissions and changes can be made without departing from the spirit and scope of the present invention.

I claim:

1. A ordered packing for intimately contacting a vapor phase with a liquid phase, said ordered packing comprising:

a plurality of elongated elements, each of the elongated elements having at least one elongated surface configured to be wet by the liquid phase and thereby form a film of the liquid phase on the at least one elongated surface;

the plurality of elongated elements packed to form a structure such that in each of a plurality of parallel planes, extending in two orthogonal directions, the elongated elements cross one another to form lattices having openings defined between the crossings of the elements;

the plurality of elongated elements interleaved within said structure such that elongated elements pass through the openings of the lattices and form repeating clusters of four of the elongated elements in a pyramid-like arrangement, thereby to provide by each of said clusters and the at least one elongated surface of each of the elongated elements thereof, at least four pathways for the liquid phase to descend through the structure; and the structure having an open area for the vapor phase to ascend through the structure and contact the descending liquid phase.

2. The ordered packing of claim 1, wherein each of the elongated elements is formed by an L-shaped channel.

3. The ordered packing of claim 2, wherein the elongated elements at their crossings contact one another along two parallel lengthwise extending edges thereof.

4. The ordered packing of claim 1, wherein the elongated elements cross one another at an angle of about 90°.

5. The ordered packing of claim 4, wherein each of the elements is formed by an L-shaped channel.

6. The ordered packing of claim 5, wherein the elongated elements at their crossing contact one another along two parallel lengthwise extending edges thereof.

* * * * *